United States Patent [19]

Monat et al.

[11] Patent Number: 4,996,493
[45] Date of Patent: Feb. 26, 1991

[54] INSTANTANEOUS ICE DETECTION SYSTEM

[76] Inventors: Seymour M. Monat, 4 Hollis Ct., Centerport, N.Y. 11721; Robert A. Monat, 9011 Butternut Ct., Indianapolis, Ind. 46260

[21] Appl. No.: 396,074

[22] Filed: Aug. 21, 1989

[51] Int. Cl.⁵ .................... G01R 27/22; G08B 19/02
[52] U.S. Cl. .................... 324/699; 324/693; 324/717; 324/721; 340/580
[58] Field of Search .......... 324/664, 685, 687, 690, 324/693, 699, 716, 717, 721, 724, 694; 340/580, 581, 601; 73/170 R

[56] References Cited

U.S. PATENT DOCUMENTS

| | | | |
|---|---|---|---|
| 2,127,823 | 8/1938 | Leifheit | 177/311 |
| 2,359,787 | 11/1944 | Peters et al. | 177/311 |
| 2,432,669 | 12/1947 | Kliever | 177/311 |
| 3,276,254 | 10/1966 | Richard | 73/170 |
| 3,517,900 | 6/1970 | Roussel | 244/134 |
| 3,882,381 | 5/1975 | Gregory | 324/687 X |
| 3,891,979 | 6/1975 | Braun et al. | 340/581 |
| 4,135,151 | 1/1979 | Rogers et al. | 324/664 |
| 4,222,044 | 9/1980 | Boschung | 340/580 |
| 4,570,881 | 2/1986 | Lustenberger | 340/582 X |
| 4,688,185 | 8/1987 | Magenheim et al. | 364/563 |
| 4,766,369 | 8/1988 | Weinstein | 324/61 R |

Primary Examiner—Reinhard J. Eisenzopf
Assistant Examiner—Jack B. Harvey
Attorney, Agent, or Firm—Leonard Belkin

[57] ABSTRACT

Method and apparatus for the real time detection of the formation of ice on a surface in which a sensor having spaced electrodes along the surface is embedded in the surface for which detection is to be provided. Resistance between the electrodes is monitored and electrode temperature is monitored. When a sharp rise in resistance on the surface due to the presence of ice is detected at the same time that the surface temperature is at or below the freezing temperature of water, then a computer provides a signal to indicate the formation of ice.

9 Claims, 4 Drawing Sheets

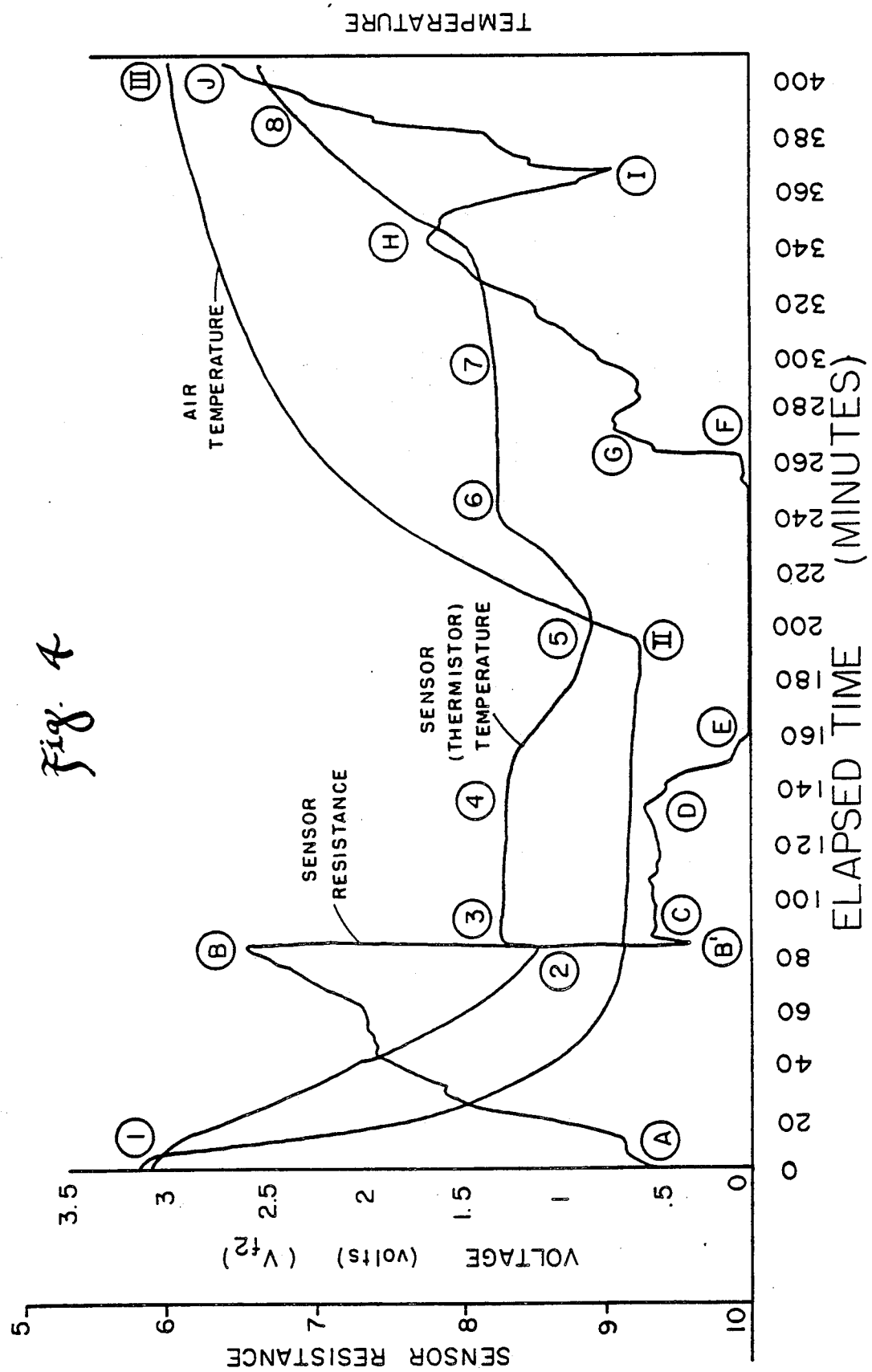

INSTANTANEOUS ICE DETECTION SYSTEM

BACKGROUND OF THE INVENTION

This invention relates to method and apparatus for the detection of the presence of ice on a surface.

The formation of ice on surfaces such as roads and the wings of aircraft may present safety hazards. In the case of aircraft, the hazard may present itself quite rapidly as the buildup of ice, once its formation is initiated, can proceed at a fast pace, sometimes with serious consequences. As has been tragically learned, deicing of an aircraft waiting to take off can produce a false sense of security, because after only a few minutes, ice formation can begin again and proceed at a rapid pace.

Efforts up to now to provide a warning at the presence of ice have produced a variety of techniques and systems which will indicate that ice is present. However, such arrangements have generally proven to be unacceptable for regular use due to a variety of factors, including the need for excessively complex apparatus. Problems of cost, lack of reliability, false warnings, and slow response times are some of the reasons why no system presently available has become generally accepted for use.

A number of ice detection systems are disclosed in U.S. Pat. Nos. 4,688,185, 4,570,881, 3,517,900, 3,276,254, 2,432,669, 2,359,787, 2,127,823, and 4,766,369. None of the preceding patents teaches the present invention.

SUMMARY OF THE PRESENT INVENTION

This invention is based on the following: the heat of fusion, and its converse, the heat of melting; the lowering of the freezing point of water when impurities are present; and the abrupt and sharp change in resistance of the water, as water changes to ice and visa versa, and the phenomenon known as fractional crystallization.

The present invention relies on the aforementioned to indicate the formation of ice.

Water is generally thought of as a weak electrolyte, which dissociates into H+ or OH− ions in the liquid phase. The number of these ions present is measured by the dissociation constant. These ions are free to move in the liquid phase under the influence of direct current, and the quantity of direct current able to be transmitted from one electrode to the other is directly proportional to the number of ions present. It is noted that water is a relatively poor conductor of electricity, compared, for example, to a NaCl solution, since water contains many fewer ions than the salt solution.

In the solid phase (ice), the H+ and the OH− ions are reduced in mobility being bound in a crystal lattice and therefore reduced in the ability to conduct an electric current, resulting in an increase in the resistance of the water as the water changes to ice.

The chemical process known as fractional crystallization plays an important part in this invention. Fractional crystallization theory and method postulates the following: when a solution consists of a solvent (water) and a solute (impurities and ice) the material that is least soluble at any given temperature will precipitate. In the case of impure water at 0 degs. C or lower, ice which is completely insoluble in water will precipitate thus coating the sensor surface with practically pure ice. The rest of the water with the impurities will be washed away or dispelled. Therefore, in the field where nature causes ice to form, the results will more approximate the results obtained by using distilled water, rather than results obtained using impure water.

According to a preferred embodiment of the invention, utilizing the principles as described above, there is provided a sensor constructed of nonconductive material embedded in the surface to be monitored, the exposed surface of the sensor being contiguous with the surrounding surface.

Mounted within the sensor are a pair of electrodes spaced from each other and made of electrically conductive material having surfaces flush with that of the exposed surface of the sensor. A specific fixed voltage source is connected across the electrodes through a voltage dividing network so that measurements taken across a fixed resistance remote from the surface can be used to measure continuously the resistance between the electrodes.

Mounted within one of the electrodes is a thermistor for measuring on a continuous basis the temperature of an electrode, effectively providing an indication of the temperature on the surface of interest.

Formation of ice is indicated at the instant when two events occur simultaneously, namely, the temperature of the electrode as measured by the thermistor is approximately at or below the freezing temperature of water (i.e., 0 deg. C) and the circuit measurements indicate a sharp rise in the electrical resistance on the surface of the base between the electrodes. A sharp rise in resistance at temperatures above freezing would indicate a false reading, or the drying of the sensor.

A system built according to the principles of this invention consists of the sensor constructed as described above, a detector to interpret the signals coming from the sensor, and means for producing the output of the system.

The output could be used either to light up a warning device to indicate the presence of ice, or to automatically institute de-icing procedure, or both.

The invention also provides a method of detecting ice formation on a surface and/or, if desired, detecting the melting of ice on such surface, which comprises monitoring the electrical resistance between a pair of electrodes mounted flush with said surface and spaced from each other, monitoring the temperature of one of the said electrodes, detecting a sudden sharp change in both the resistance and temperature indicative of the fact that freezing is imminent and/or, if desired, detecting a different abrupt and sharp change at a point where melting has occurred, whereby appropriate output signals may be generated to initiate a control function.

The invention further provides a method of measuring the thickness of ice that forms on the sensor. The sensor measures the resistance of ice as it forms across the electrodes. If the temperature of the electrodes is fairly constant, (which is the usual condition when ice is forming under natural conditions) then the resistance across the electrodes varies as the thickness of ice being formed on the sensor. Even in the event that the temperature is not constant, the sensor can be calibrated to account for the change in resistance due to temperature changes. Any resistance change above this change due to temperature would be solely due to an increase in the thickness of ice on the sensor. By calibrating this additional increase in the resistance, the read out device determines the thickness of the ice formed on the sensor in inches or millimeters. By reversing the chronology of the measurements, as the ice starts to melt and the thickness decreases, the actual thickness of the remaining ice can be determined. By measuring the time that elapses as the thickness of ice increases or decreases the rate of accretion or decrement can be determined.

It is thus a principal object of this invention to provide a way of detecting rapidly the formation of ice on a surface, and, if desired, the point in time when ice has melted.

Other objects and advantages of this invention will hereinafter become obvious from the following description of preferred embodiments of this invention.

BRIEF DESCRIPTION OF THE DRAWINGS

FIG. 4 is a graph showing the abruptness of the resistance and temperature change at the times of freezing and melting of distilled water.

DESCRIPTION OF THE PREFERRED EMBODIMENTS

Figure 1:
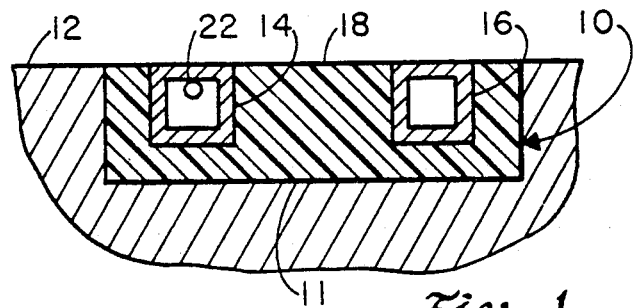
FIG. 1 is a section view along 1—1 of FIG. 2 of a sensor constructed in accordance with the principles of this invention mounted in a surface on which the presence of ice is to be detected.

Referring to FIG. 1, sensor 10 constructed in accordance with the principles of this invention is shown installed in the surface 12 on which ice is to be detected.

Surface 12 may be the airfoil surface of an aircraft wing, the airfoil surface of a helicopter rotor, the roadway surface of a bridge, high voltage electric transmission cables, transmission towers, antennas, railroad tracks, or virtually the surface of any object on which it is desired to detect the presence of ice even before such ice becomes visible to the eye.

Figure 2:
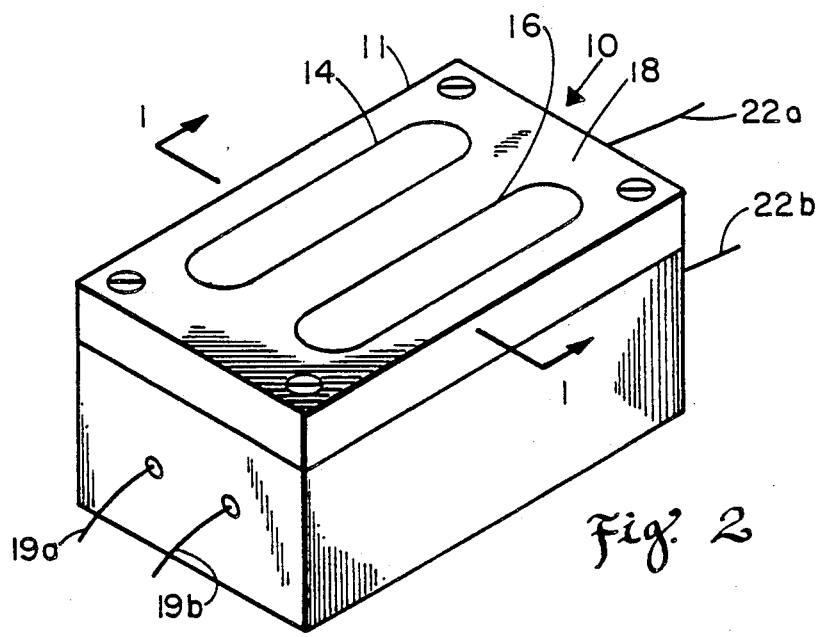
FIG. 2 is an isometric view, partially schematic, of the sensor shown in section in FIG. 1.

As also seen in FIG. 2, sensor 10 consists of a block 11 of suitable insulating material such as a rigid plastic material, for example, Delrin, in which is embedded a pair of electrodes 14 and 16 of electrically conductive material, such as brass, and which may be hollow and rectangular in cross section. It will be noted that one surface in this preferred embodiment of each of the electrodes is flush with one surface 18 of block 11. The surfaces of the electrodes may, however, be elevated slightly above surface 18. Electrical lead lines 19a and 19b connected internally to electrodes 14 and 16 are shown leaving sensor 10.

In one of the electrodes, for example, electrode 14, is mounted in any suitable fashion a thermistor 22, for a purpose to be described below. This thermistor need not be mounted within the electrode but can be mounted flush with the surface of the sensor. Electrical lead lines 22a and 22b connected internally to thermistor 22 are shown leaving sensor 10.

The entire assembly is then sealed in an epoxy or silicone sealer to prevent the penetration of water or ice. The invention will work even though a thin layer of sealer covers the electrodes. However the invention appears to work more efficiently if the exposed surfaces of the electrodes are not covered.

Figure 3:
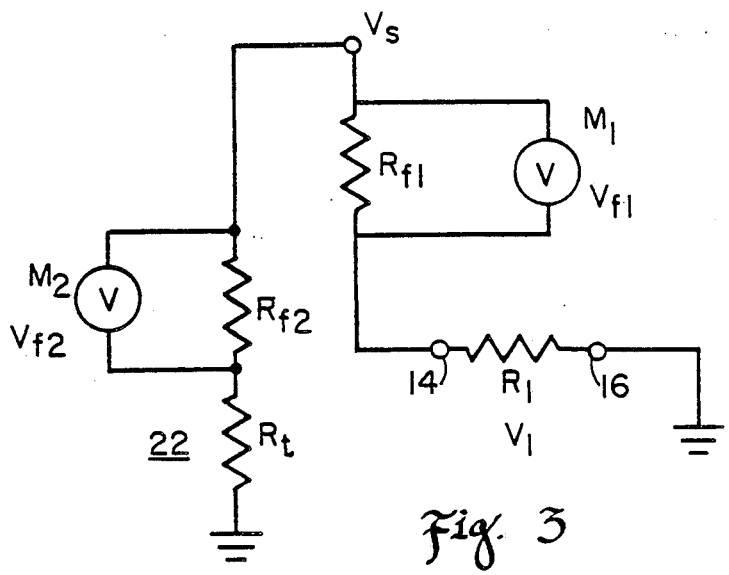
FIG. 3 is an electrical schematic diagram illustrating the manner of measuring resistance to indicate the presence of ice.

Referring to FIG. 3, there is shown a voltage divider circuit in which $V_s$ represents a source of a specific fixed DC voltage, $R_{f1}$ represents a resistance across which voltage is monitored by a meter $M_1$ to indirectly determine the resistance between electrodes 14 and 16, $R_t$ represents the resistance of thermistor 22, and $R_{f2}$ is a resistance in series in $R_2$ across which voltage $V_{f2}$ is measured by meter $M_2$ to indicate indirectly the resistance of $R_t$ and hence the temperature of electrode 14. $R_1$ is the resistance between electrodes 14 and 16. Current flow through thermistor 22 indicates directly, as is understood in the art, according to the calibration of that device, the temperature of electrode 14 and hence the temperature of surface 12.

From an examination of FIGS. 1 and 2 it will be readily seen that voltage $V_{f1}$ measured across resistance $R_{f1}$ will indicate the value of electrical resistance between electrodes 14 and 16 and that a drop in voltage $V_{f1}$ indicates an increase in resistance $R_1$.

Under dry conditions, the resistance $R_1$ is the resistance through block 11 between electrodes 14 and 16. The resistance is quite high due to the nonconductive nature of the material and the surrounding dry air. When the surface is wet or is covered by ice or a mixture of ice and water, this resistance will be reduced significantly.

The resistance of air containing moisture is in excess of $50 \times 10^6$ ohms. Pure dry air, which is not encountered in practice, has a resistance of $10^{14}$ ohms. Ice has an initial resistance between 0.1 and 1 megohm but can reach as high as 30 megohms. The resistance of water in this specific embodiment is below 0.1 megohm.

When water begins to appear on surface 12 and the value of $R_1$ drops to a more significant value where it has a measurable effect, the relationship $$R_1 = \frac{V_s - V_{f1}}{V_{f1}} \times \frac{R_{f1} R_{m1}}{R_{f1} + R_{m1}}$$

becomes highly meaningful.

In the foregoing equation, which can be derived using Ohm's law and Kirchoff's laws, $R_1$ is the resistance between electrodes 14 and 16.

$V_s$ is the voltage source.

$V_{f1}$ is the voltage across $R_{f1}$.

$R_{f1}$ is the fixed resistance in series with $R_1$ used for determining $R_1$ indirectly.

$R_{M1}$ is the resistance of voltage meter $M_1$.

A number of experiments have been conducted which prove the validity of the concept underlying the present invention. FIG. 4 is a graph showing the abrupt changes in temperature and resistance both at the time of freezing and at the time of melting in an experiment in which the sensor is immersed in distilled water in a freezer.

The theory underlying what actually occurs in nature involves fractional crystallization and is quite complex. For purposes of the invention, it is adequate to explore the physical results.

In FIG. 4, points on a curve representing resistance between the electrodes 14 and 16 are represented by letters; points on a curve representing temperature as detected by thermistor 22 are represented by Arabic numbers, and points on a third curve representing air temperature are represented by Roman numerals. In actuality, air temperature much below 0 degs. C does not play an important role in the detection system; but its effect has been carefully explored to confirm this assumption. The temperature and sensor resistance curves have their own scale as illustrated. It will be noted that sensor resistance has an inverse relationship to voltage $V_{f2}$. The scale for the sensor resistance is arbitrary to show relationships and not in ohms.

What FIG. 4 shows is this: as the ambient air temperature drops, the sensor temperature also drops. However, the sensor resistance goes down as water collects on the surface of the sensor until B is reached. Meanwhile, the sensor temperature drops further until 2 is reached. This temperature then abruptly increases to 3. It is noted that B and 3 occur at approximately the same moment.

Thermistor 22 actually represents the temperature of the distilled water in which the sensor is immersed. From 1 to 2 the temperature of the water is lowered, and at 2 the water has been super-cooled. In the short interval between 2 and 3, ice is starting to form. The temperature from 3 to 4 is constant. This condition can occur only when there is a combination of water and ice. At B—B' there is a dramatic rise in sensor resistance as the water changes to ice represented by a discontinuity in the curve. It is this discontinuity which indicates that ice is forming.

As long as there is a mixture containing as little as one drop of water in conjunction with ice, there can at this stage be no change in the temperature of the sensor because of the heat of fusion of water. At 4 all water has been changed to ice, and the temperature of the ice (i.e., the electrode is measured by thermistor 22) now decreases (as the ambient air temperature is lowered) until 5 is reached.

Number 5 corresponds to II, at which point the freezer has been turned off and its cover removed. Now, the temperature starts to rise. At 6 some of the ice has changed to water. This level state continues until 7. Somewhere between 6 and 7 there is a sharp drop in sensor resistance, as shown from F to G.

This change in resistance continues gradually to H, and then changes considerably from H to I. (This particular change is not completely understood, but obviously does not affect the invention). At 7, all the ice has been melted.

For detection of icing, the critical moments occur at B and 3. For detection of melting, the critical moments occur at 7 and H.

While an experiment based on the freezing of distilled water gives clear and excellent results, one must go further and consider the effect of impurities which may be present in the water. Extensive investigation of this aspect has been performed with the discovery that, while the curves will vary from one combination to another within the range of impure water encountered in practice, the abrupt changes signaling freezing and melting will differ, but they will not disappear. Thus, it is clear that the invention, when properly understood, is operable within the entire range of practical applications.

Figure 5:
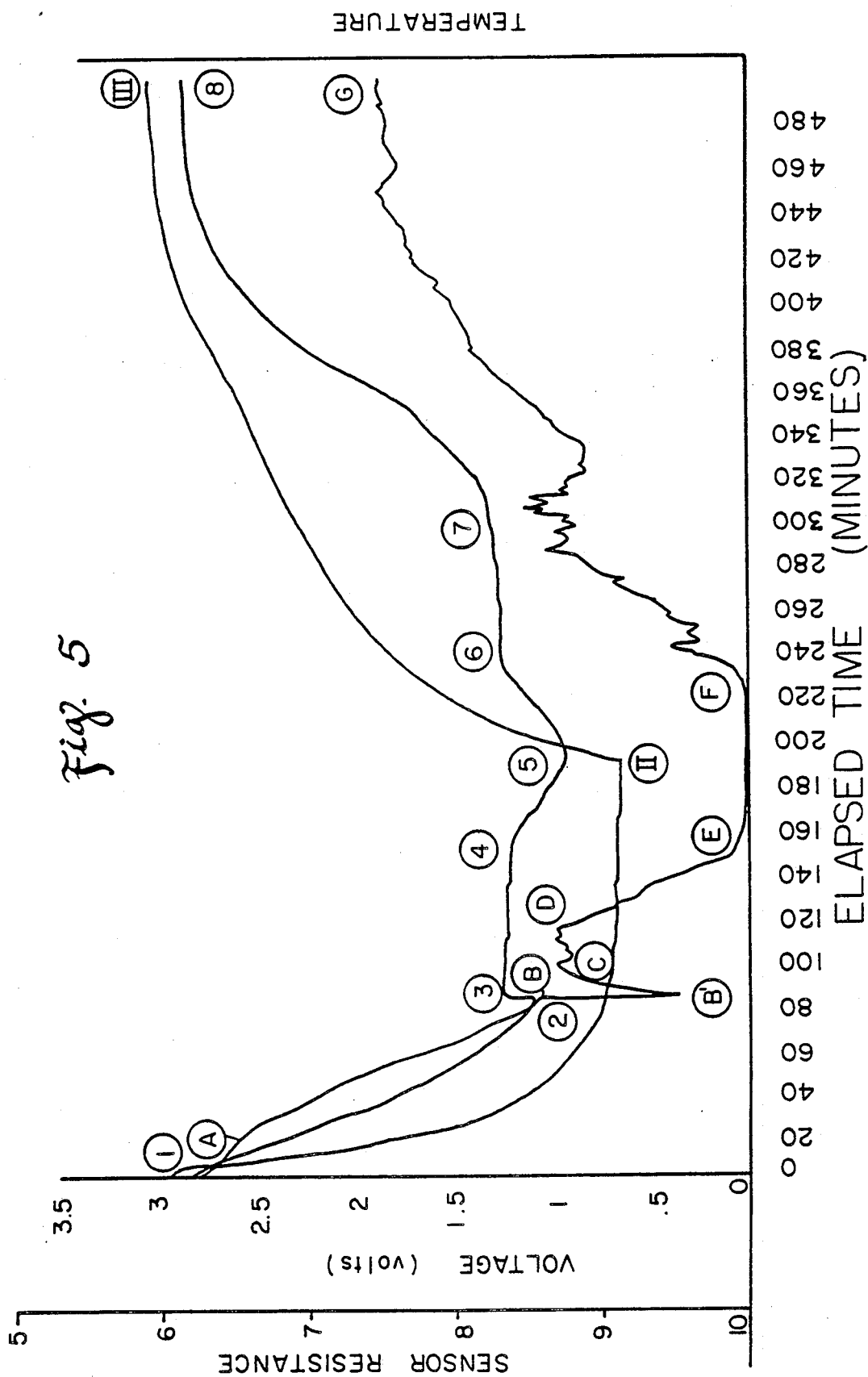
FIG. 5 is a similar graph where carbonated water has been substituted for distilled water.

To demonstrate how the problem of impurities is approached, reference is made to FIG. 5 showing a chart of the results when the water has been carbonated. The plotting in this chart is in all respects the same as in the chart of FIG. 4.

In this experiment, as contrasted with the experiment using distilled water, the resistance of the sensor rises until B is reached. The sensor temperature drops until 2 is reached. Again, drastic changes at B and 3 occur at approximately the same moment. This is the detection point for freezing as in the experiment of FIG. 4. Again, at 2 the water becomes super-cooled. In the short interval between 2 and 3 ice is starting to form. The remainder of the graph of FIG. 5 is very similar to the graph of FIG. 4 except for the interval between 6 and 7. This interval, showing slight increase in temperature, will be of theoretical interest since it shows the phenomenon known as fractional crystallization.

Referring to FIGS. 4 and 5, the sensor resistances from A to B in both graphs are radically different. In FIG. 4 the voltage increases (resistance decreases.) In FIG. 5 the voltage decreases (resistance increases.) Sensor resistances from B to F show basically the same configurations.

The above facts, acquired through experimentation, prove that impurities affect only the liquid phase of $H_2O$ in the operation of our ice detection system, and that impurities do not affect the solid phase, i.e., the detection of ice. This is further proof that the phenomenon of fractional crystallization plays a role in the effective operation of our ice detection system.

Figure 6:
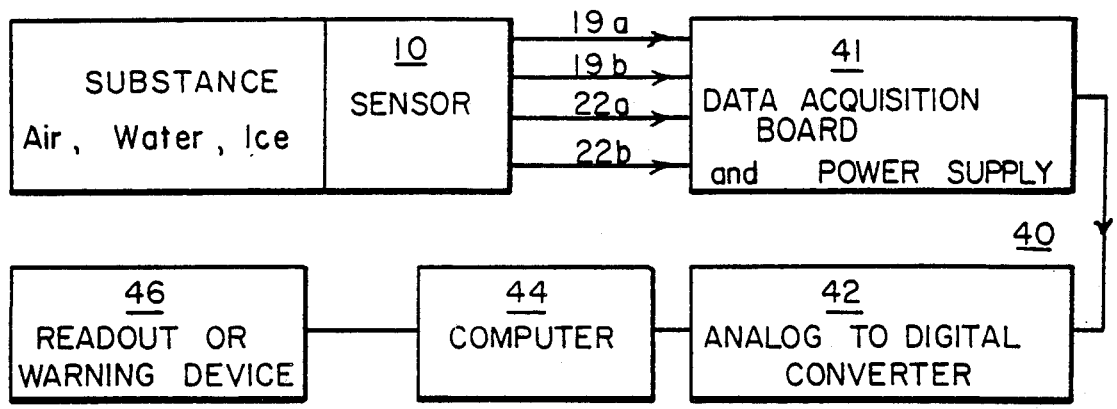
FIG. 6 is a system block diagram to process the data obtained from the sensor.

A system designed in accordance with this invention to carry out the purpose described herein is shown as a block diagram in FIG. 6. System 40 consists of sensor 10 connected through leads 19a and 19b from the electrodes and leads 22a and 22b from thermistor 22 to a data acquisition board and power supply 41 of known commercial type, and then to an analog-to-digital converter 42 which converts the voltage from an analog representation to a digital representation to be used by a computer 44.

Computer 44 includes a program to track electrode temperature recorded by thermistor 22 and resistance $R_1$ between electrodes 14 and 16 in sensor 10. When resistance $R_1$ begins to drop sharply as the result of a discontinuity as shown by B—B' in the graph of FIG. 4, computer 44 will deliver an output signal to readout or warning device 46, provided electrode temperature is at or below the freezing point of water.

It should be understood that in the use of system 40 as described herein there may be multiple sensors 10 in a particular application, in which case there would be corresponding analog-to-digital converters 42, and computer 44 would be programmed to identify and conform its response to the particular sensor or sensors involved.

Experimental runs involving the use of solutions, such as weak NaCl solutions, to approximate actual environmental conditions, were also conducted, and while the numbers differed, the shapes of the curves were sufficiently similar to the curve shown in FIG. 4, to be consistent with and useful in accordance with this invention to detect the formation of ice.

Figure 7:
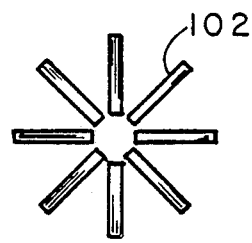
FIGS. 7, 8 and 9 show alternative sensor designs.
Figure 8:
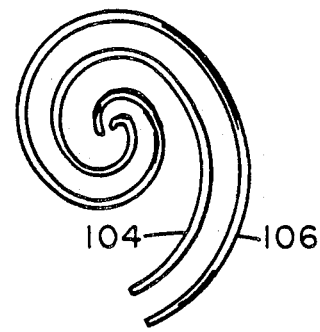
Figure 9:
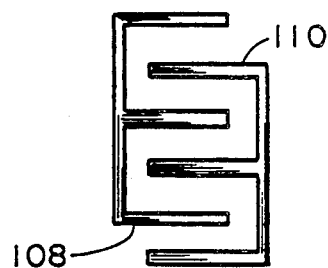

While only a single configuration of a pair of electrodes has been described, as illustrated in FIG. 2, a variety of other configurations is possible including more then two electrodes depending on particular circumstances including the shape and location of the surface to be mounted. For example, a number of electrodes may be employed radially arranged as electrodes 102 in FIG. 7, a pair of electrodes 104 and 106 in spiral configuration as shown in FIG. 8, and a pair of electrodes 108 and 110 inter-digitated as shown in FIG. 9.

Other configurations, not illustrated, could include a pair of electrodes which are curved and parallel with each other, sinusoidal, circular and concentric with each other, square or rectangular concentric with each other, and more than two with variable spacings.

It is thus seen there has been provided unique method and apparatus for determining the formation of ice before such ice is visible to the eye. While only certain preferred embodiments of the invention have been described it is understood that many variations are possible without departing from the principles of this invention as defined in the claims which follow.

What is claimed is:

1. Apparatus for the early detection of ice on an instantaneous basis on a surface comprising sensor means embedded in said surface, said sensor means comprising a block of non-conductive material containing a pair of spaced electrodes of conductive, metallic material and having surfaces contiguous with or elevated slightly above the surface of said block and the surrounding surface, means for measuring instantaneously the electrical resistance between said electrodes, means for measuring electrode temperature to indicate the temperature of said surface, and means responsive to said measuring means for producing a signal indicating instantaneously the presence of ice when both said electrode temperature and said resistance simultaneously undergo a discontinuity indicating the freezing of water.

2. The apparatus of claim 1 wherein said means for measuring electrical resistance includes a voltage dividing network.

3. The apparatus of claim 1 wherein one of said electrodes includes means to measure said electrode temperature.

4. The apparatus of claim 3 wherein said electrodes are rectangular in cross section and are coextensive with each other.

5. The apparatus of claim 3 wherein said electrodes are spiral in configuration and coextensive with each other.

6. The apparatus of claim 3 wherein said electrodes are radially disposed on said surface.

7. The method of detecting instantaneously ice formation on a surface comprising the steps of:
   a. providing sensor means mounted flush with said surface comprising a block of non-electrically conductive material containing a pair of spaced metallic electrodes having surfaces flush with or slightly elevated above said surface;
   b. providing an electrical circuit in conjunction with said electrodes capable of measuring electrical resistance between said electrodes;
   c. determining the instantaneous electrical resistance between said electrodes;
   d. measuring electrode temperature in said sensor means thereby indicating the temperature of said surface; and
   e. indicating instantaneously the presence of ice on the surface of said block between said electrodes when electrode temperature and electrical resistance between said electrodes simultaneously undergo a discontinuity.

8. The method of claim 7 wherein the detection of the resistance above the minimal amount at a given temperature necessary to initiate the ice detection system indicates the thickness of ice formed on the sensor and by combining said thickness with an elapsed time measurement the rate of accretion of ice can be determined.

9. An apparatus that adjusts to varying conditions imposed by different impurities and atmospheric conditions to detect the presence of ice by measuring the discontinuities that occur in temperature and resistance for the early detection of the freezing of water and the formation of ice instantaneously, said discontinuities being determined from a surface directly exposed to said water and said ice comprising sensor means embedded in said surface, said sensor means comprising a block of non-conductive material containing a pair of spaced electrodes of conductive, metallic material and having surfaces contiguous with or elevated sightly above the surface of said block and the surrounding surface, means for measuring instantaneously the electrical resistance between said electrodes, means for measuring electrode temperature, and means responsive to said measuring means for producing a signal indicating instantaneously the presence of ice when both said electrode temperature and said resistance simultaneously undergo a discontinuity that positively shows the freezing of water.

* * * * *